May 25, 1954 E. A. HENRY 2,679,588

AMPLITUDE SELECTIVE AMPLIFIER

Filed July 7, 1951 2 Sheets-Sheet 1

INVENTOR.
ELLIOTT A. HENRY

BY Joseph H. Lipschutz

ATTORNEY

May 25, 1954 E. A. HENRY 2,679,588

AMPLITUDE SELECTIVE AMPLIFIER

Filed July 7, 1951 2 Sheets-Sheet 2

INVENTOR.
ELLIOTT A. HENRY

BY Joseph H Lipschutz

ATTORNEY

Patented May 25, 1954

2,679,588

UNITED STATES PATENT OFFICE 2,679,588

AMPLITUDE SELECTIVE AMPLIFIER

Elliott A. Henry, Bridgeport, Conn., assignor to Sperry Products, Inc., Danbury, Conn., a corporation of New York Application July 7, 1951, Serial No. 235,643

2 Claims. (Cl. 250—27)

This invention relates to amplifiers and has for its principal object the provision of an amplifier having a circuit arrangement which will result in rejecting signal voltages of a predetermined amplitude while providing an amplification for any other signal voltage that is a function of the difference between the latter signal voltage and the rejected signal voltage. Such an arrangement offers many desirable possibilities. For example, in inspecting objects by transmitting ultrasonic pulses therein and measuring the time interval that elapses between transmission of the pulse and the reception of its reflection from within the object it is desirable to eliminate from the amplifier the transmitted pulse which is of such large amplitude as to result in a long recovery period. During this period, reflections cannot be detected. Other possibilities of this invention are a non-linear amplifier gain characteristic, either positive or negative; and, in combination with other elements, an amplifier circuit arrangement that will provide constant output for input signal voltage of varying amplitude.

Further objects and advantages of this invention will become apparent in the following detailed description thereof.

In the accompanying drawings.

Figure 1:
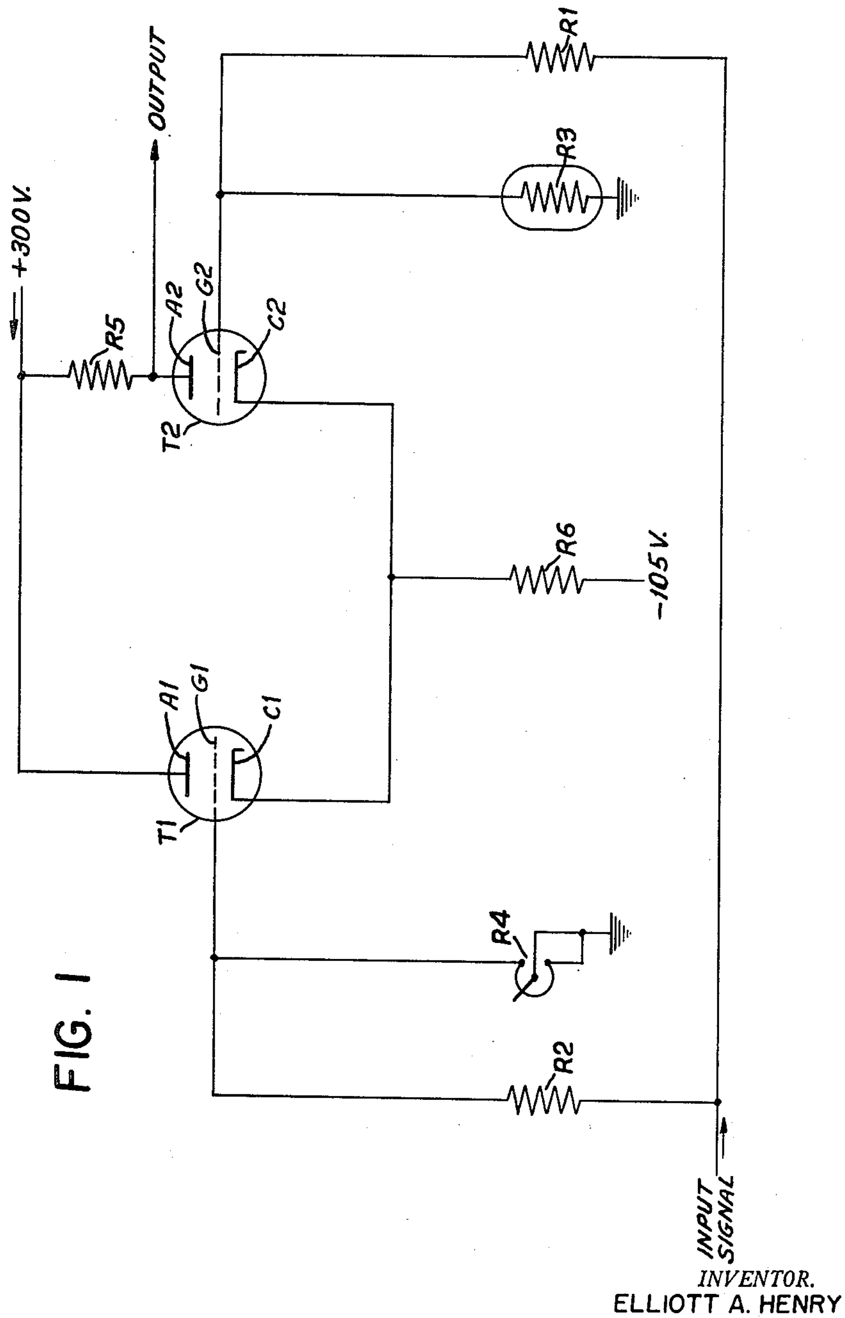
Fig. 1 is a wiring diagram embodying this invention.

In order to accomplish the foregoing object of the invention, i. e., to eliminate from the amplifier an input signal voltage of predetermined amplitude while providing amplified output of other signal voltages as a function of the difference between the latter signal voltages and the predetermined signal voltage, I provide the basic circuit disclosed in Fig. 1. In this circuit two tubes T1 and T2 are provided, each tube having anode A1, A2, grid G1, G2, and cathode C1, C2. The anodes are supplied from a suitable source of plus voltage, the grids are connected so that the input signal voltage is applied to both grids simultaneously, and the cathodes are interconnected so that the cathode output of tube T1 is applied to the cathode of tube T2. If no additional elements were provided, all input signal voltages would thus be cancelled out in the amplifier since grid G1 and cathode C1 would both equally and simultaneously vary in the same direction. However, it is desired that only one predetermined input signal voltage be cancelled out, while variations from this predetermined voltage be passed.

In order to effect cancellation of one predetermined input signal voltage while permitting the differential of other input voltages to be passed, I cause the input signal voltage to be applied to grid G1 through a voltage divider R2, R4, and to grid G2 through a voltage divider R1, R3. The voltage divider R2, R4 is such that variations in input signal voltage produce corresponding direct variations in grid voltage on the tube T1 which are a fixed percentage of the input signal voltage; but the voltage divider R1, R3 is such that variations in input signal voltage produce non-linear variations in grid voltage on the tube T2 such that the grid voltage on T2 varies inversely to the variations in input signal voltage. It will thus be apparent that the graphs of grid voltage related to input signal voltage for the tubes T1 and T2 will extend in opposite directions and cross at only one common point. This point is the predetermined input signal voltage which it is desired to cancel out of the amplifier output.

To accomplish the aforesaid result, one of the resistors R3 is a non-linear resistance whose resistance is a function of the voltage impressed across it and whose resistance decreases as the impressed voltage increases. Such a resistance may be silicon-carbide with a ceramic binder sold under the trade-name Thyrite. The greater the amplitude of the impressed signal voltage, the greater will be the voltage on grid G1, the greater the cathode output C1, the greater the cathode voltage C2, but the smaller the voltage on grid G2. Resistor R4 is adjustable so that at any desired predetermined input signal voltage, there will be no output from T2 because the voltages on G2 and C2 are equal. Any variation from the predetermined input signal voltage will, however, because of the inverse action of non-linear resistance R3 result in a differential voltage between G2 and C2 and hence output from T2.

Figure 2:
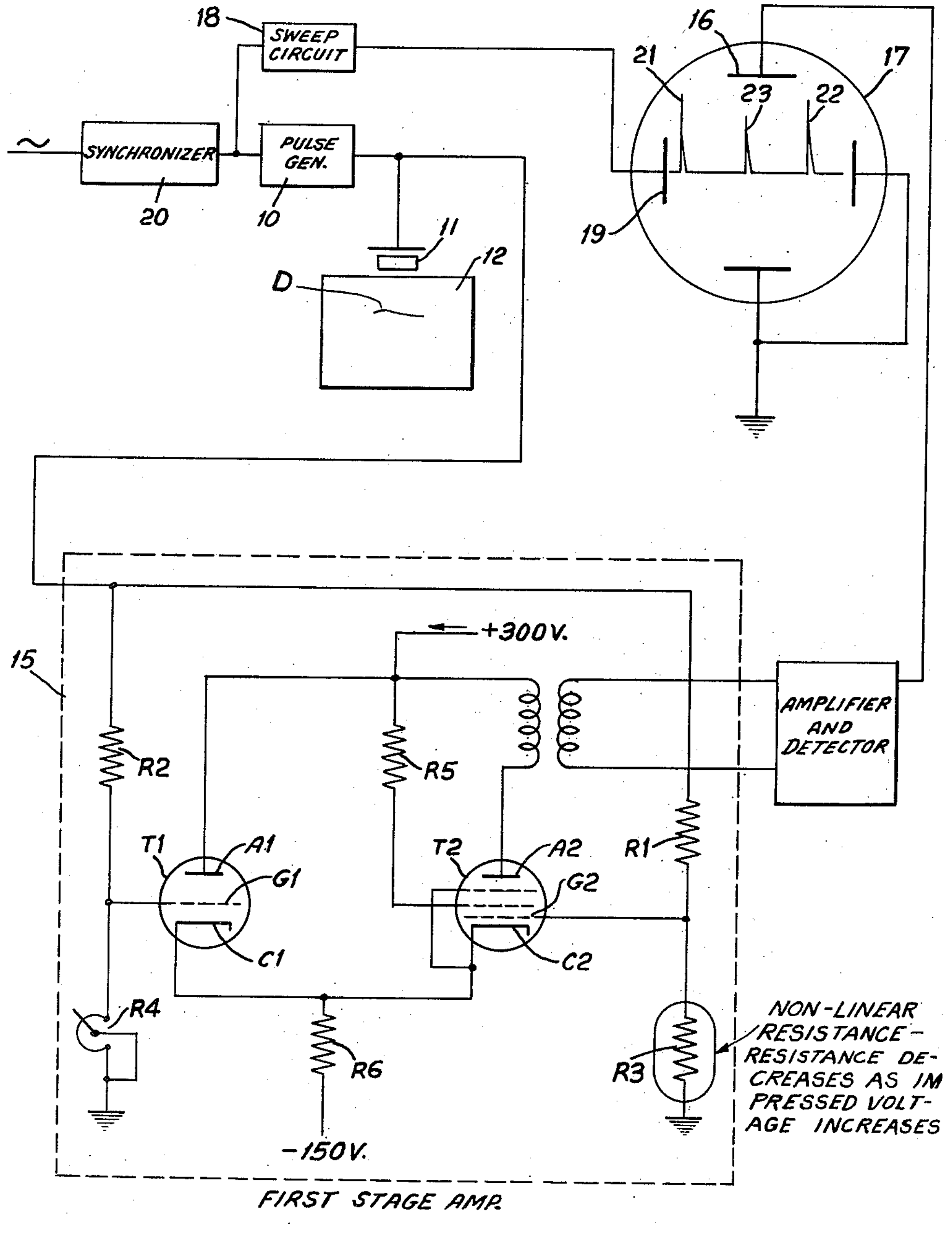
Fig. 2 is a wiring diagram showing the basic circuit of Fig. 1 applied to ultrasonic inspection of objects.

In Fig. 2, there is shown one application of this invention to the ultrasonic inspection of objects by the pulse technique. A pulse generator 10 is periodically energized to apply a high frequency electric pulse to a quartz crystal 11 which transforms it into an ultrasonic pulse and transmits it into an object 12 under inspection. The pulse is reflected back either by a bounding surface of the object or by any intermediate reflecting surface such as defect D. The crystal is connected to an amplifier 15 whose output may be applied to the vertical plates 16 of an oscilloscope 17. A sweep circuit 18 is generated between horizontal plates 19, the sweep being synchronized with the pulse through a synchronizer 20 energized periodically as from a 60 cycle A. C. source. There will thus be indicated on the sweep, the transmitted pulse at 21, the reflection from the back surface of the object 12 at 22, and the reflection from an intermediate surface such as defect D at 23. In such system it may be desirable to eliminate the indication due to the initial transmitted pulse, as stated in the introduction hereto. Therefore, the resistor R4 of voltage divider R2—R4 is adjusted so that there is no output from tube T2 for an input signal voltage corresponding to the voltage generated at the crystal by the pulse from generator 10. The input signal voltages corresponding to the reflected pulses indicated at 22 and 23, being smaller than the generated signal voltage will continue to produce an output from the amplifier which can be applied to the vertical plates of the oscilloscope.

Having described my invention, what I claim and desire to secure by Letters Patent is:

1. An amplifying circuit having a signal voltage input and a signal voltage output, said circuit having means for rendering said amplifier ineffective to transmit a signal voltage input of predetermined magnitude but effective to transmit and amplify the differential between said predetermined voltage and input signal voltages greater or less than said predetermined voltage, said means comprising a pair of tubes each having anode, grid and cathode, a pair of voltage-dividing networks, each network having an intermediate output point connected to the grid of the respective tube, means for applying a signal voltage to the voltage-dividing networks, means for applying the output voltage from the cathode of the first tube to the cathode of the second tube whereby the output voltage from the second tube will be zero when the second tube has the same potentials on its grid and cathode as those on the grid and cathode respectively of the first tube, the network for the first tube having means including a variable resistor for providing at said output point voltages directly proportional to the input signal voltages, and the network for the second tube having means for providing at said output point voltages substantially in phase with the voltages applied to the grid of the first tube but which are an inverse function of the input signal voltages, said variable resistor being adjustable to provide the same grid voltage on the first tube as exists on the second tube for said signal voltage of predetermined magnitude.

2. An amplifying circuit as specified in claim 1, in which the network for the second tube is provided with a non-linear resistance whose resistance varies inversely as the voltage applied thereto.

References Cited in the file of this patent

UNITED STATES PATENTS

| Number | Name | Date |
| --- | --- | --- |
| 2,179,414 | Konkle | Nov. 7, 1939 |
| 2,276,565 | Crosby | Mar. 17, 1942 |
| 2,340,617 | Sanford | Feb. 1, 1944 |
| 2,480,201 | Selove | Aug. 30, 1949 |